INVENTORS
JOSEPH A. W. MILLS
BY DENNIS H. CANNON

Reynolds, Beach +
Christensen
ATTORNEYS

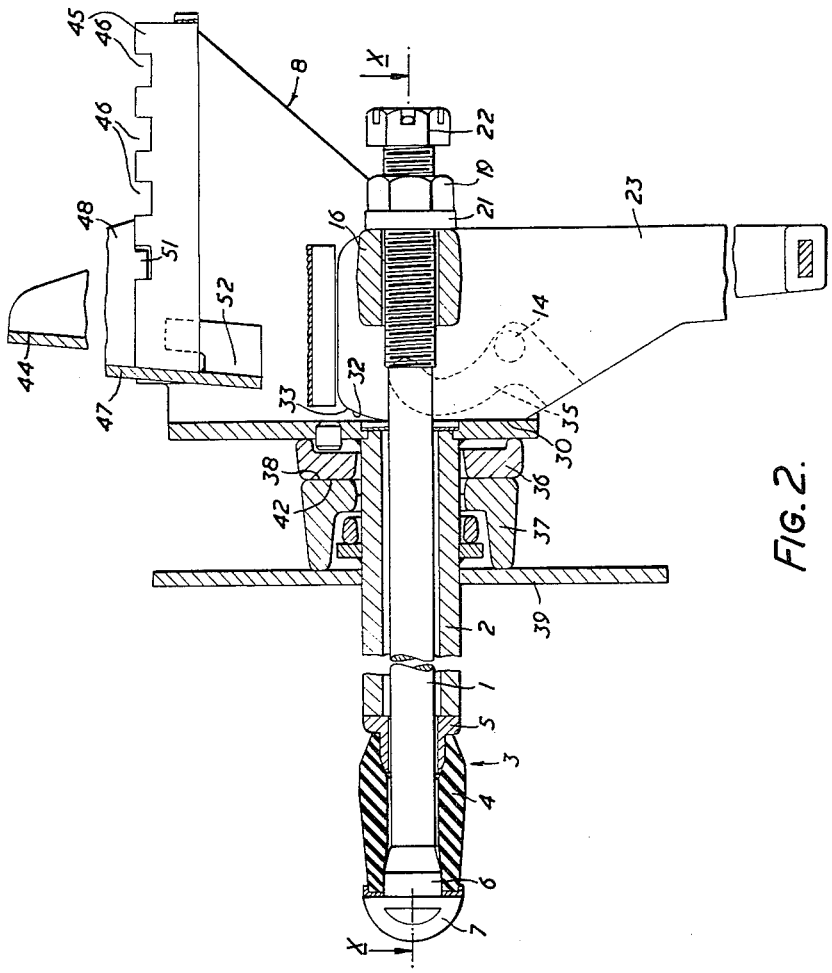

United States Patent Office 3,093,026
Patented June 11, 1963

3,093,026
EXPANDABLE BOLT WITH AUXILIARY STRESSING MEANS
Joseph A. W. Mills, Charlton Kings, Cheltenham, and Dennis H. Cannon, St. Marks, Cheltenham, England, assignors to Dowty Mining Equipment Limited, Tewkesbury, England, a British company
Filed June 22, 1959, Ser. No. 821,812
Claims priority, application Great Britain June 23, 1958
3 Claims. (Cl. 85—2.4)

This invention relates to expandable bolts intended for insertion and locking within a bore hole in rock strata, mineral material or other solid material, for example the strata which surrounds excavations in mines. Such bolts when used in rock strata may be intended to strengthen the strata to prevent crumbling and/or to hold some equipment firmly against the face of the strata. Bolts of this nature which have been employed hitherto have suffered from the disadvantage that they are difficult to remove from the locked position in the bore hole and if removed cannot be used again.

It is the object of this invention to provide an expandable bolt which may be easily and quickly recovered after use and which can be used again subsequent to recovering. A further object of this invention is to provide an expandable bolt which is easily and quickly removable and recoverable by an operator standing at a distance from the bolt in a position of safety.

Figure 1:
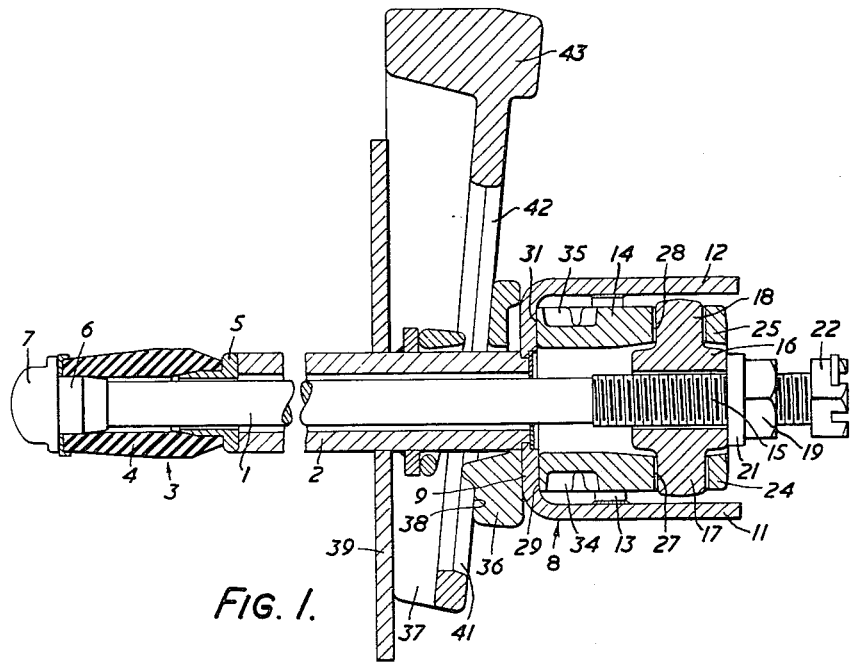
Figure 3:
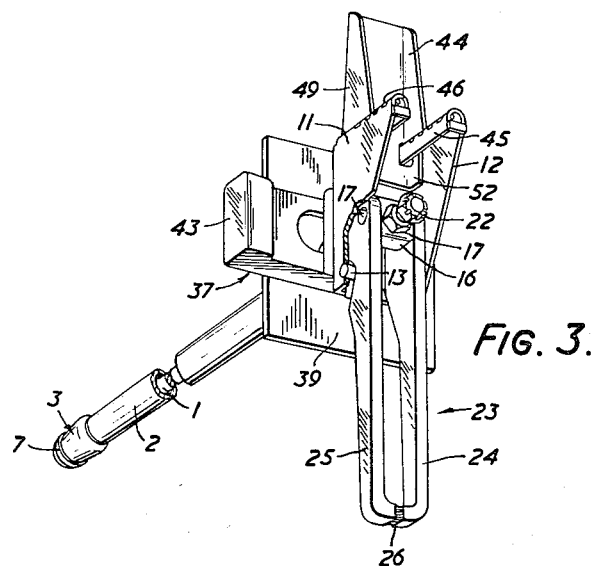

In order that the invention may be clearly understood one example thereof will be described with reference to the accompanying drawings in which:

FIGURES 1 and 2 are longitudinal sections at right angles to one another through the expandable bolt; and FIGURE 3 is a perspective view of the expandable bolt.

The shank 1 extends loosely within the sleeve 2 and their length is such that the expandable head 3 in its relaxed condition may be entered to a desired distance within a bore hole to effect locking by its subsequent expansion. The expandable head 3 comprises one or more rubber bushes 4, one only being shown, located between a flange 5 bearing upon the outer end of the sleeve 2 and a flange 6 secured under the head 7 of the end of shank 1. The bush 4 is tapered in shape with its greatest diameter close to the flange 5 at the end of the sleeve to ensure that initial gripping between the bush 4 in the bore hole will take place at this position. This in turn ensures that there will be very little movement of the sleeve within the bore hole whilst the shank 1 is moved outwardly to compress the bush longitudinally and effect radial expansion of the bush to cause locking. At the outer end of the sleeve 2 a bracket 8 of channel cross-section is secured. The securing may be by welding the sleeve into the base 9 of the bracket 8, the two sides 11 and 12 of the bracket extending away from the end of the sleeve. On the inner surface of each side 11 and 12 pins respectively 13 and 14 are secured by welding. The outer end of the shank 1 is screw threaded at 15 and protrudes beyond the outer end of the sleeve 2 between the sides 11 and 12 of the bracket. Slidably mounted on the screw threaded portion 15 is a trunnion 16 having outwardly extending trunnion pins 17 and 18.

The nut 19 engages the screw thread 15 and acts against the trunnion 16 through a washer 21. At the outer end of the thread 15 a further nut 22 is locked in position, or other stop means are located, to ensure that the nut 19 cannot be removed from the screw thread 15.

A release lever 23 extends from within the bracket 8 substantially at right angles to the longitudinal axes of shank and sleeve. This lever comprises two parallel portions 24 and 25 secured together at their outer ends by welding 26. The inner ends of these lever portions 24 and 25 pivotally engage with the pins 17 and 18 of trunnion 16 by means of holes 27 and 28 formed in these two lever portions. Each of the lever portions 24 and 25 is provided with a cam surface respectively 29 and 31 which engages the base 9 of bracket 8. Each of these cam surfaces includes a flat portion 30 engaging the base 9 when the lever is in the locked position at right angles to the longitudinal axes of shank and sleeve as shown in the drawings. If the lever is moved pivotally on the pins 17 and 18 another portion of the cam surfaces indicated at 32 comes into contact with the base 9. This portion of the cam is a curve struck from the centres of the holes 27 and 28. As the lever moves further angularly a flat portion indicated at 33 of the cam surfaces will come into contact with the base 9. This flat surface is considerably closer to the pins 17 and 18 than the surface 30 and thus during the main part of movement of the lever 23 to a position where it is in line wtih the axis of the shank 1 the shank will move inwardly relatively to the sleeve. This permits relaxation of the bush 4 releasing its grip within the bore hole.

Each of the lever portions 25 and 26 at its inner end includes a cam groove respectively 34 and 35 formed on its outer surface for engagement respectively with the pins 13 and 14. These grooves are wider than the pins 13 and 14 so that during angular movement of the lever 23 the grooves 34 and 35 will slide over the pins 13 and 14 without exerting any influence. The engagement of the pins 13 and 14 at the ends of the grooves 34 and 35 when the lever 23 has moved to a position in line with the longitudinal axis of the shank and sleeve allows a positive force to be transmitted from the lever to the bracket 8 so that pulling effected on the lever in this position will pull the sleeve rather than the shank. Thus the bolt can be removed from its bore hole without any tendency for tension to be applied to the shank which might expand the bush 4 into locking engagement with the bore hole.

For the purpose of pre-loading the bolt when it is locked in position a wedge mechanism is provided which comprises a pair of wedge members 36 and 37 acting between the underside of the base 9 of bracket 8 and a square patch plate 39 which is slidable on the sleeve 2. The wedge member 36 is loosely secured in position against the underside of the base 9 by engagement on the sleeve 2 and it includes an inclined wedge surface 38. The other wedge member 37 includes an elongated hole 41 extending parallel to its direction of wedge movement and an inclined wedge surface 42 for co-operation with the wedge surface 38. The side of the wedge member 37 opposite to the wedge surface 42 engages against the patch plate 39 which under normal conditions will lie approximately perpendicular to the longitudinal axis of the sleeve. When the bolt has been locked into a bore hole, the large end 43 of wedge member 37 is hammered to move the wedge member 37 transversely to push the patch plate against the surface of the rock strata or the like against tension load in the sleeve 2 and shank 1 thus pre-loading the bolt in position.

For the purpose of carrying equipment or apparatus an adjustable bracket 44 is carried by the sides 11 and 12 of the fixed bracket 8. These sides 11 and 12 are each approximately in the form of a right angled triangle, one edge of which is integral with the base 9 and another edge extending at right angles to the base 9 to carry the adjustable bracket 44. Each of the sides 11 and 12 at the edge to carry the bracket 44 are folded over as seen more clearly at 45 in FIGURE 3 and the outwardly facing portions are provided with several slots 46, four being shown. The bracket 44 is itself of shallow channel cross-section having a base 47 and a pair of sides 48 and 49. The ends of the sides 48 and 49 are each provided with a lug 51 engageable within any one of the slots 46. The base 47 extends between the sides 11 and 12 of bracket 8 and carries lugs 52 which engage under the inner edges of the turned over portions 45 of the sides 11 and 12 of the bracket 8. The brackets 44 illustrated are particularly intended to support heavy boards against the strata surface and when a bolt has been locked in position and prestressed, a board is placed between the strata face and the bracket 44 which latter is pushed as far as possible towards the strata face to a position where lugs 51 engage in a set of slots 46 to hold the board loosely but securely in position.

The expandable bolt as described is particularly intended for use in the end walls of mine tunnels to prevent the rock strata from collapsing into the tunnel. The side walls and roof of the tunnel are normally provided with roof bars or arches to prevent collapse. To fix an expandable bolt in position the hole is bored and the bolt is then pushed into the hole to the extent that the patch plate 39 engages the strata surface whilst the wedge member 37 is in its outermost position as shown in FIGURE 1 and the lever 23 is in the locked position as shown in FIGURES 2 and 3. A wrench is then applied to the nut 19 to rotate it and to apply tension to the screw thread 15 and shank 1 which will cause longitudinal contraction of rubber bush 4 and consequent radial expansion into engagement with the bore hole. When a sufficient locking engagement has been obtained the wedge 37 is hammered into position to pre-load the bolt. A board is then located in position by the adjustable bracket 44. When it is desired to remove the bolt and there is a danger that after bolt removal the strata will crumble, a chain or cable is attached to the end of lever 23 and extended to a safe position from which a miner can pull the chain. The pull exerted on the chain causes the lever 23 to rotate on the pins 17 and 18 to remove locking force from the shank 1 allowing the bush to pull the shank inwardly. When the lever as pulled by the chain comes into line with the axis of the shank the bolt will be completely unlocked within the hole. Further pull exerted on the chain by the miner is then transmitted through the ends of the slots 34 and 35 to the pins 13 and 14 and thus to the sleeve 2 and the bolt will be pulled from the hole without any danger that the pulling force can act on the shank to effect locking. Continued pulling by the miner will enable him to retrieve the bolt without approaching the strata surface. The bolt as recovered is normally entirely intact and immediately available for locking into another bore hole.

Many variations of the above construction are possible within the scope of the present invention of which the following are examples:

(a) The cam mechanism of the lever may be substituted by a toggle linkage to act between the sleeve and the shank.

(b) The adjustable bracket may be carried by the patch plate rather than by the fixed bracket.

(c) The locking head may comprise a plurality of rubber bushes loosely mounted on the shank and axially compressed for radial expansion between the shank and the sleeve.

(d) The cam mechanism and the loose pin and slot connection of the lever to the bolt may be replaced by a toggle link connection between the lever and the bolt, the lever being directly pivotally connected to the fixed bracket at the end of the sleeve whilst toggle links extend from the lever to the trunnion on the screw threaded end of the shank. The locked position is arranged to occur at a dead centre position of the toggle. In the unlocked position force applied to the lever is transmitted directly through pivoted connections in the bracket to the sleeve for withdrawing the bolt.

We claim as our invention:

1. An expandable bolt suitable for insertion into and locking within a bore hole in a medium, the bolt including a shank and an enlarged head constituting an inner end on said shank, a sleeve surrounding the shank, an expandible head located between the inner end of the shank and the inner end of the sleeve for radial expansion by relative longitudinal movement in one direction between the shank and the sleeve to effect locking within a bore hole, locking means operatively connected to the shank and the sleeve to effect said relative longitudinal movement between the shank and the sleeve, and stressing means operable between the outer end of the bolt and a surface of said medium containing said hole after the expandable head has been locked in the bore hole by the locking means to apply a stress between the outer end of the bolt and the surface of the medium containing the bore hole by causing equal movement of the shank and the sleeve relative to the surface of the medium containing the bore hole.

2. An expandable bolt suitable for insertion into and locking within a bore hole in a medium, the bolt including a shank and an enlarged head constituting an inner end on said shank, a sleeve surrounding the shank, an expandible head located between the inner end of the shank and the inner end of the sleeve for radial expansion by relative longitudinal movement in one direction between the shank and the sleeve to effect locking within a bore hole, locking means operatively connected to the shank and the sleeve to effect said relative longitudinal movement between the shank and the sleeve, and wedge means loosely and captively mounted on the sleeve and operable between the outer end of the bolt and a surface of said medium containing said hole after the expandable head has been locked in the bore hole by the locking means to apply a stress between the outer end of the bolt and the surface of the medium containing the bore hole by causing equal movement of the shank and the sleeve relative to the surface of the medium containing the bore hole.

3. An expandable bolt according to claim 2 wherein the wedge means includes a wedge member loosely and captively mounted on the sleeve, the wedge member having an elongated slot through which the sleeve passes and the sleeve having a cylindrical outer surface whereby the wedge member can be driven into a stressing position from any position around the sleeve.

References Cited in the file of this patent

UNITED STATES PATENTS

| | | |
|---|---|---|
| 211,253 | Norris | Jan. 7, 1879 |
| 737,323 | Blakesley | Aug. 25, 1903 |
| 1,523,663 | Slama | Jan. 20, 1925 |
| 2,708,588 | Prah | May 17, 1955 |

FOREIGN PATENTS

| | | |
|---|---|---|
| 320,872 | Germany | June 29, 1919 |
| 160,448 | Great Britain | Oct. 27, 1921 |
| 112,475 | Australia | Feb. 4, 1941 |
| 131,777 | Australia | Sept. 14, 1945 |
| 728,225 | Great Britain | Apr. 13, 1955 |